United States Patent [19]
Cook

[11] 3,833,122
[45] Sept. 3, 1974

[54] FLOATING CHEMICAL FEEDING AND CHEMICAL PROCESS PLANT FOR WATER PURIFICATION

[76] Inventor: Donald F. Cook, Apartado Aereo 2987, Cali, Colombia

[22] Filed: June 9, 1971

[21] Appl. No.: 151,187

[52] U.S. Cl.............. 210/207, 210/242, 210/260, 210/532
[51] Int. Cl............................................ B01d 21/08
[58] Field of Search..... 210/242, DIG. 21, 195–198, 210/260, 261, 170, 501, 265, 207, 532; 61/.5, 1 F

[56] References Cited
UNITED STATES PATENTS

| | | | |
|---|---|---|---|
| 1,703,373 | 2/1929 | Travers | 210/501 |
| 2,603,597 | 7/1952 | Daily | 210/260 |
| 3,113,699 | 12/1963 | Crawford et al. | 61/.5 |
| 3,477,581 | 11/1969 | Stearns | 210/195 |
| 3,503,512 | 3/1970 | Desty et al. | 210/DIG. 21 |
| 3,572,506 | 3/1971 | Bandy, Jr. | 210/242 |
| 3,627,135 | 12/1971 | Goodman | 210/195 |
| 3,642,134 | 2/1972 | Reckers | 210/265 |
| 3,701,428 | 10/1972 | Lesh | 210/170 |

FOREIGN PATENTS OR APPLICATIONS

| | | | |
|---|---|---|---|
| 221,874 | 2/1908 | Germany | 210/242 |
| 816,440 | 6/1956 | Great Britain | 61/1 F |

*Primary Examiner*—Theodore A. Granger
*Attorney, Agent, or Firm*—Clarence A. O'Brien; Harvey B. Jacobson

[57] ABSTRACT

A chemical process plant for water purification and a pure water storage tank are provided which may be floated in a river, lake, reservoir or other body of water which serves as the source of supply. Each structure is comprised of a flotation collar with a rigid support frame and an enclosure made of lightweight, relatively inexpensive materials such as flexible fiberglass reinforced plastics.

2 Claims, 7 Drawing Figures

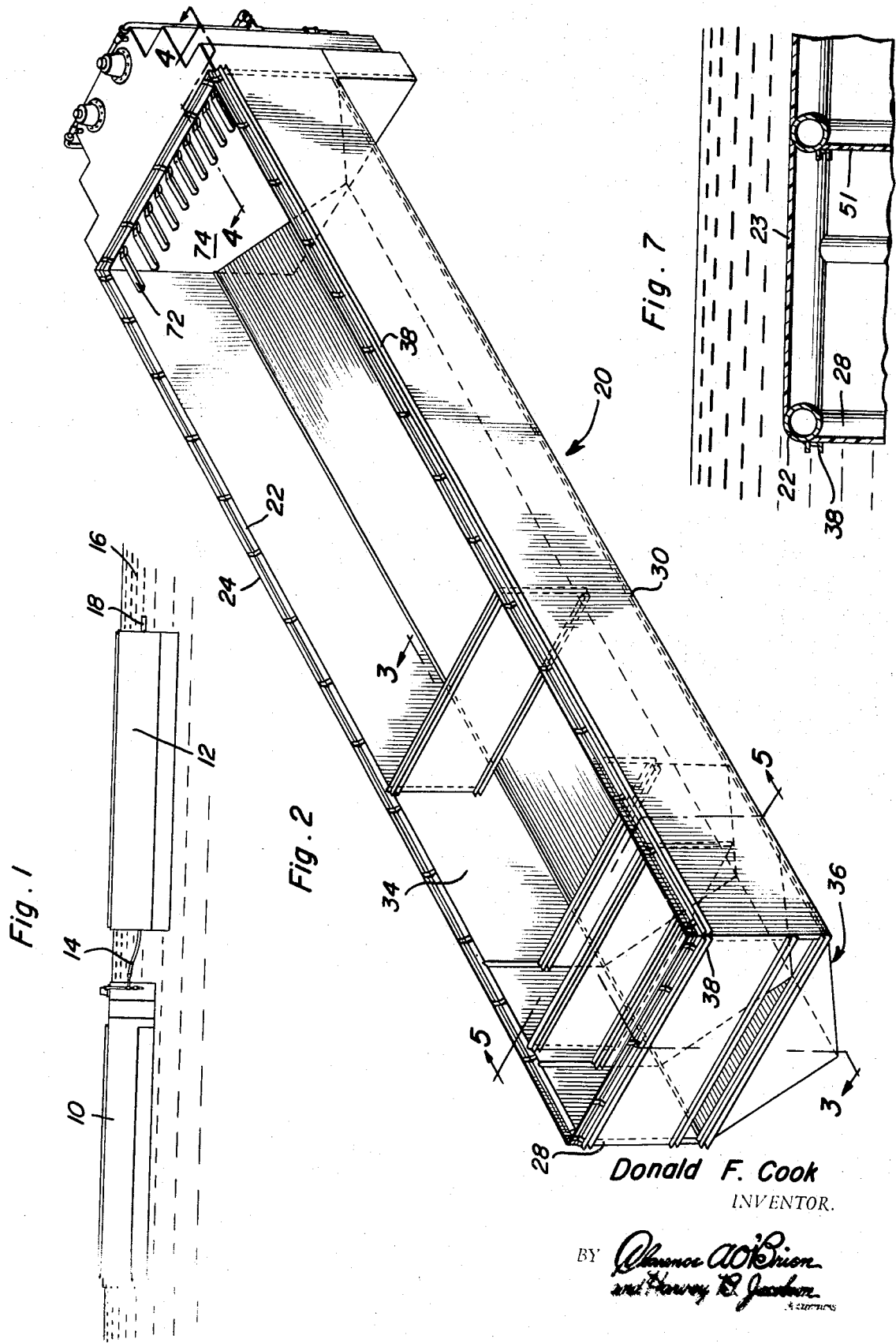

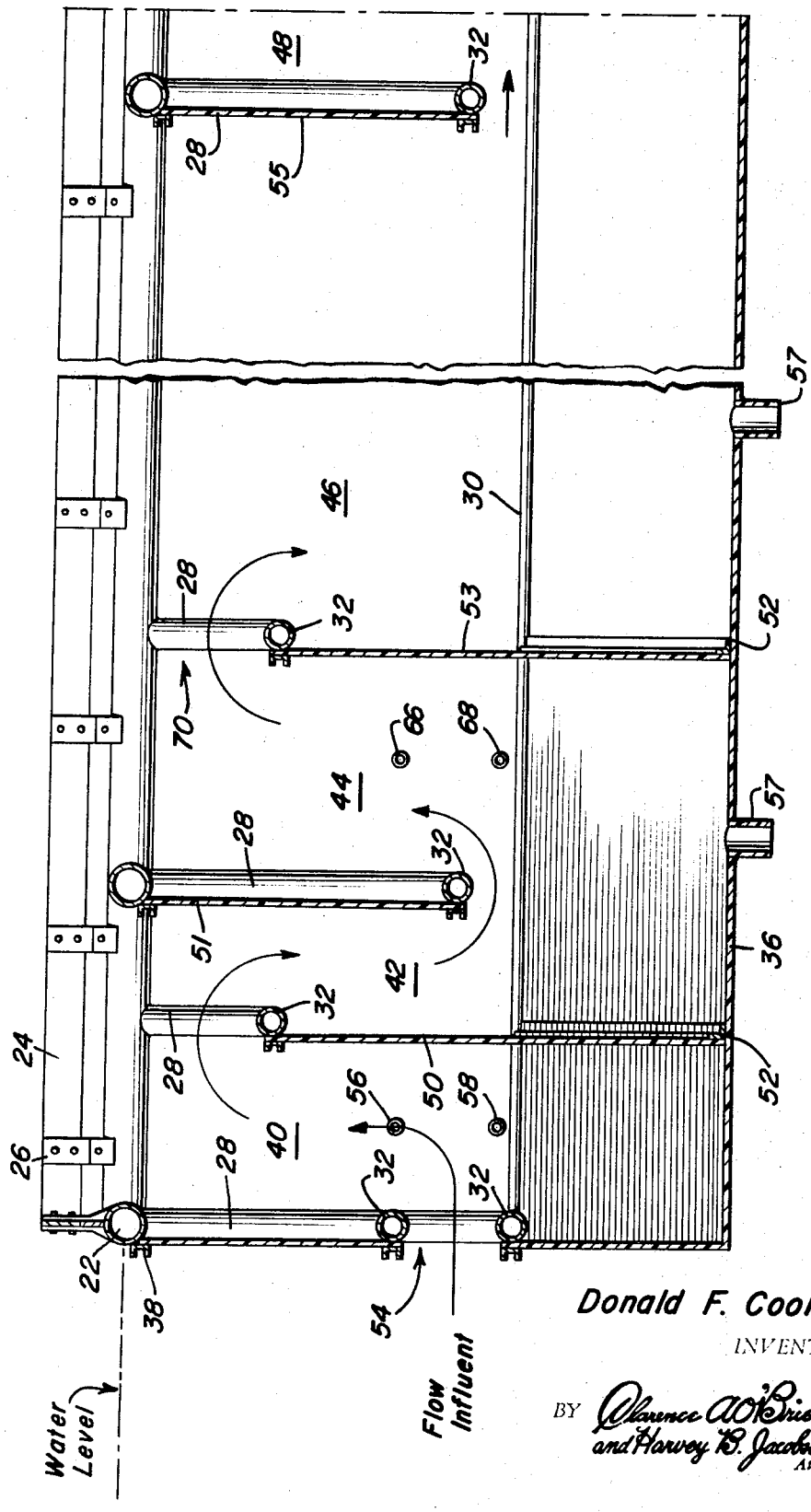

Donald F. Cook
INVENTOR.

BY *Clarence A. O'Brien*
*and Harvey B. Jacobson*
Attorneys

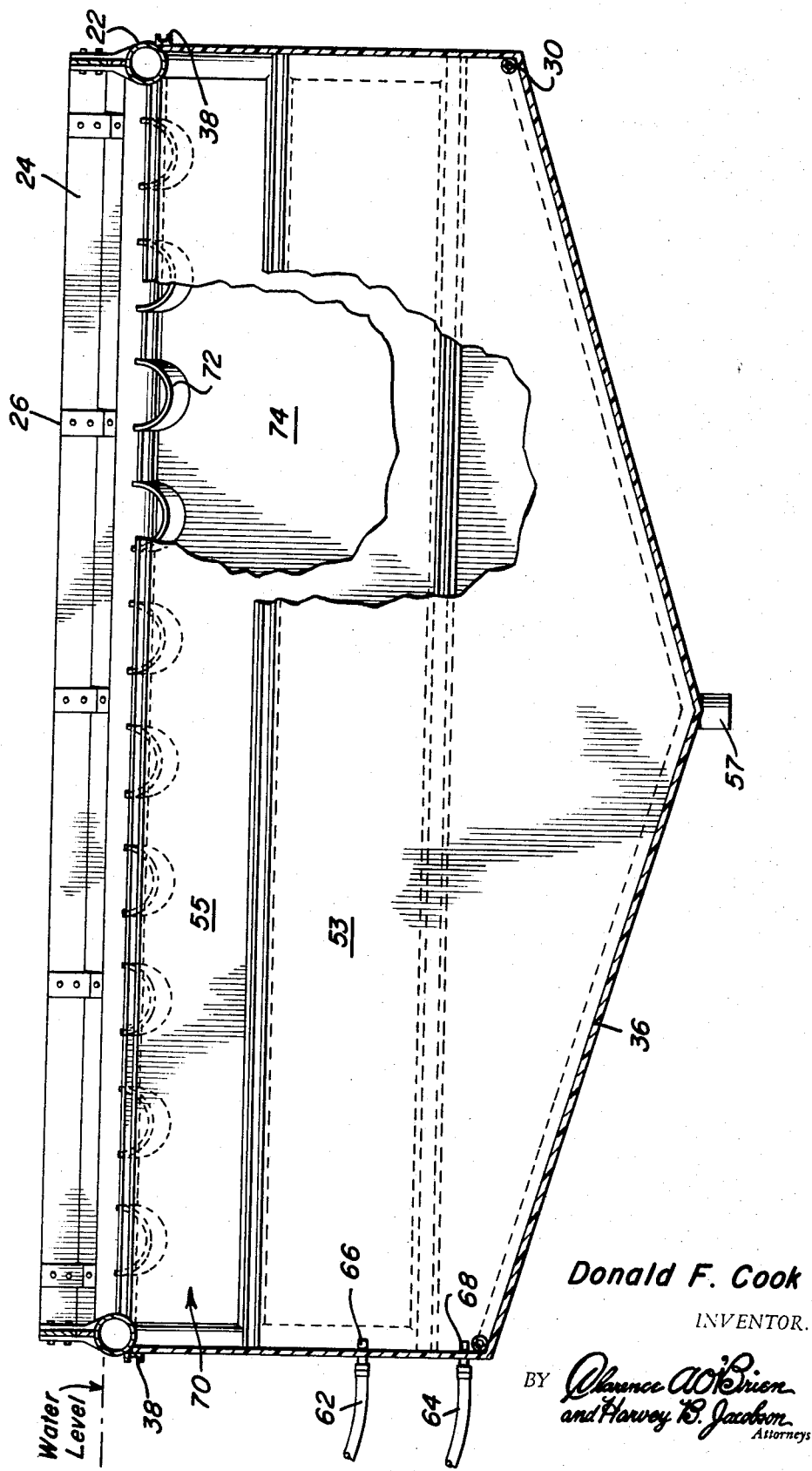

FLOATING CHEMICAL FEEDING AND CHEMICAL PROCESS PLANT FOR WATER PURIFICATION

Water purification and storage tanks in the past have been constructed on land and required expensive excavation, concrete structures and other building materials. Such construction projects generally involve high labor costs, which are increasing at a rapid rate year after year. The result has been that the high costs of such construction has created increased tax burdens and higher per-gallon water costs which must be borne by the citizens of a community. In addition, growing communities desiring to increase their water supply are often faced with the time delay factor inherent to such construction projects.

It is an object of the present invention to provide a water purification plant which may be floated in a lake, river or reservoir, thereby providing a versatile, relatively inexpensive source of pure water.

Another object of the instant invention is to provide a chemical feeding and chemical process plant wherein the chemical feeding, mixing, sediment and reaction chambers are incorporated into a single floating structure.

A further object of the present invention is to provide a versatile, relatively inexpensive floating structure which may be used for pure water storage.

It is still another object of the present invention to provide a chemical process and chemical feeding plant for water purification which does not require costly excavations and expensive building materials, is relatively simple to construct, long lasting and impervious to the elements.

Another object is to provide relatively inexpensive water purification and storage tanks which are permanently anchored, or otherwise secured, in a floating condition in a lake, river, reservoir or other body of water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 illustrates a floating water purification plant coupled with a floating pure water storage tank.

FIG. 2 is a perspective view of a typical water purification plant.

FIG. 3 is a sectional view of the purification plant taken along plane 3—3 of FIG. 2.

FIG. 5 is a cross-sectional view of the purification plant looking lengthwise along plane 5—5 of FIG. 2 with portions broken away.

FIG. 7 is a fragmental sectional view, similar to a portion of FIG. 3, but illustrating a modified form of the invention in which a closure panel is provided so the plant can be operated when submerged below water level.

Figure 6:
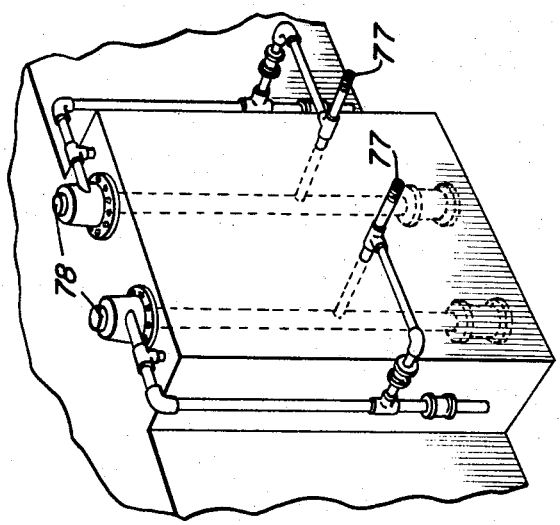
FIG. 6 is a partial perspective view of the effluent end portion of purification plant.
Figure 4:
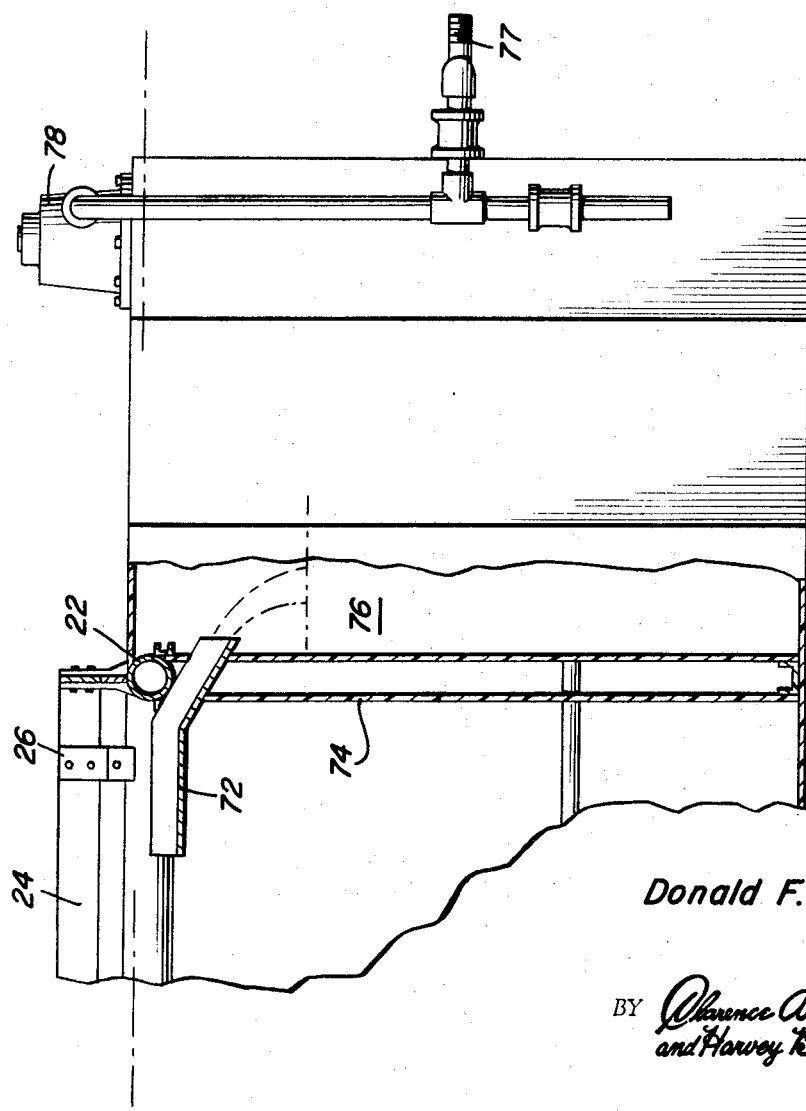
FIG. 4 is a sectional view of the effluent end of the purification plant along plane 4—4 of FIG. 2.

Referring specifically to the drawings, FIG. 1 illustrates a pair of floating structures 10 and 12 coupled together by a flexible pipe member 14. Both of the structures 10 and 12 are anchored or secured in position by conventional means, not shown, and include side walls which extend above the level of the body of water 16. A water supply line 18 extends from the water storage tank to a convenient point of distribution such as a master pumping station. When the floating storage tank is not essential, it may be eliminated from the over-all system, and the water may be supplied directly to an on-land reservoir or conventional water storage from purification plant 10. It is possible for the floating structures to be transported from place to place to provide an emergency source of water supply where needed. Also, it is possible to provide submerged structures wherein the top is covered and sealed in a manner similar to the side wall construction.

FIG. 2 illustrates in more detail a typical water purification plant generally designated by the numeral 20. The plant is comprised of a rigid framework of welded steel or similar material which supports a plurality of fiberglass reinforced wall sections. The top of the framework is comprised of a hollow, airtight flotation collar 22 of cylindrical shape which extends around the upper perimeter of the structure. Flotation collar 22 contains a sufficient volume of air to provide the necessary buoyant force to the over-all structure so that the outside raw water level remains below its upper surface, as shown in FIGS. 3 and 5. In addition, a splashboard 24 extends above the flotation collar to prevent a significant amount of raw water from entering the top of the structure due to waves and other turbulence which might occur. The splashboard 24 may be made from wood, fiberglass or similar materials, and is fastened to flotation collar 22 by way of brackets 26. Where high waves or heavy turbulence is anticipated, the top of the structure may be appropriately covered to further prevent significant amounts of undesired raw water from entering the system.

Vertical steel frame members 28 are welded, or otherwise fastened, to flotation collar 22, and extend downwardly at each corner and at several locations along each side wall. A pair of horizontal frame members 30 are welded to the corner vertical frame members 28 and extend the entire length of the structure. A plurality of transverse frame members 32, extend across the structure between vertical frame members 28, as shown in FIG. 3, to additionally support the structure and to support a plurality of chamber separating panels.

The outer walls 34 and V-shaped bottom 36 of the structure are made of lightweight, fiberglass reinforced plastic. The plastic walls and bottom may be comprised of a plurality of individual sheets or may be of unitary molded fiberglass construction. Since the entire structure, which is floated in the raw water, is substantially filled with water, the bottom and side walls are subjected to only small pressure differences. For this reason, the enclosing walls and bottom may be made of relatively thin, flexible fiberglass reinforced plastic. Such an arrangement substantially reduces the construction costs of each structure. It will be appreciated that the costs may be further reduced by mass producing the structures and using fiberglass molding processes. The side walls 34 may be appropriately fastened to flotation collar 22 and other frame members by way of channel members 38 which may be made of a fiberglass resin.

FIG. 2 illustrates a typical chemical feed and chemical process structure. The structure is divided into several chambers 40, 42, 44, 46 and 48 by a plurality of vertical panels 50, 51, 53 and 55 also of fiberglass reinforced plastic construction. Referring to FIG. 3, each panel is secured to a transverse frame member 32 by way of channel members 38. The lower edges of panels 50 and 53 extend downwardly to the V-shaped bottom 36 and are further anchored to rigid angle iron members 52 which are welded to the horizontal frame members 30. The bottom areas adjacent chambers 44 and 46 are provided with sludge ports 57 to facilitate removal of sludge and other products associated with the purification processes.

In a typical purification process, raw water enters the structure by way of opening 54 formed in the end wall of the structure and flows into chamber 40 where a lime slurry and air are introduced through inlets 56 and 58 respectively. The water proceeds through opening 60 into chamber 42 where it is deflected downward past the V-shaped bottom portion and up into chamber 44. In chamber 44 air and alum flash mixing is carried out by the introduction of alum and air through lines 62 and 64 connected to inlets 66 and 68 respectively. The flow is diverted upward by panel 53 and through opening 70 into flocculation chamber 46. As the water continues to flow through the flocculation chamber it is diverted downward by panel 55 where it enters the bottom of settling chamber 48.

At the opposite end of chamber 48 are a plurality of overflow weirs 72 fastened to end wall 74 approximately three inches beneath the surface of the water. Thus, the water eventually leaves settling chamber 48 by way of overflow weirs 72 and enters settled water chamber 76. From here the water may be pumped through outlets 77 by constant speed turbine discharge pumps 78. Since the water level in chamber 76 may be substantially below the surrounding water level, pressure differences may exist on the walls of chamber 76. Accordingly, the walls of chamber 76 are made of a stronger, more rigid construction than the previously mentioned walls.

In the preferred embodiment of the water purification plant, the over-all structure is approximately 220 feet in length, with a depth of about 30 feet, and a width of approximately 100 feet. The air filled flotation collar is about 20 inches in diameter. However, it should be noted that the size and the number of chambers may be varied depending upon the particular requirements, such variations being within the scope of the present invention.

It will be appreciated that the water storage structure is basically the same as that of the chemical process plant with the exception of the chamber panels, sludge ports and raw water inlet. A pumping section similar to that of the purification plant may be included in the water storage structure when necessary.

It will be appreciated that these structures are constructed of inexpensive fiberglass reinforced materials which cost much less than steel or similar metals yet are not susceptible to corrosion and other forms of deterioration as are most metals which are exposed to water over a period of time. Therefore, the present invention provides a structure which is relatively inexpensive to maintain. Furthermore, the plastic is much lighter than most metals making flotation much easier and less expensive to achieve. Since the water pressure differential is maintained at a negligible level, the fiberglass reinforced plastic may be relatively thin and even flexible under normal conditions, thereby further reducing the over-all costs.

FIG. 7 illustrates a modified form of the invention in which the device is provided with a closure panel 23 of the same character as the various wall panels, baffles and the like and which is attached to the float collars 22 in a similar manner. This construction provides a sealed construction which enables the water purification plant to operate effectively when submerged below water level.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A floating water purification plant for removing contaminants from raw water anchored in a body of said raw water, said plant including flotation means for buoying the plant above the level of the surrounding raw water, an enclosure connected with said flotation means for holding water, said flotation means comprising an airtight pipe extending around the perimeter of said enclosure, and said enclosure including a plurality of walls extending downwardly from said flotation means to a lower edge portion, a bottom connected to the lower edge portion of said plurality of walls, an inlet opening in one of said plurality of walls beneath the level of the surrounding raw water for drawing raw water into said enclosure and outlet means for discharging water from said enclosure, a plurality of panels extending vertically within said enclosure to define a plurality of process chambers, a plurality of first frame members extending downwardly from said airtight pipes on the inside of said enclosure, and a plurality of transverse frame members extending between said first downwardly extending frame members, each of said plurality of panels being attached to at least one of said transverse frame members to hold it firmly in place, said panels being arranged with the top edges of alternate panels spaced below the pipe and the bottom edges of the other panels spaced above the bottom of the enclosure, a settled water chamber at the end of said enclosure remote from said raw water inlet opening, and pumping means in fluid communication with said settled water chamber for pumping settled water from the plant, said walls, bottom and panels being formed from a lightweight, flexible material, at least a portion of said airtight pipe normally extending above the level of raw water surrounding said plant, splashboard means extending above said airtight pipe for preventing the raw water from entering the plant, said bottom being substantially V-shaped and including openings therein for discharging contaminants therethrough, said process chambers including a first chamber communicating with said inlet opening, said first chamber including lime slurry and air inlet ports therein, a second chamber including alum and air inlet ports therein, a flocculating chamber and a settling chamber, said second chamber and said flocculating chamber including openings in the floor thereof for discharging contaminants therethrough, said panels comprising baffle means defining a tortuous path for raw water passing from said inlet opening through said enclosure to said outlet means.

2. A floating water purification plant for removing contaminants from raw water anchored in a body of said raw water, said plant including flotation means buoying the plant above the level of the surrounding raw water, an enclosure connected with said flotation means for holding water, said flotation means comprising an airtight pipe extending around the perimeter of said enclosure, and said enclosure including a plurality of walls extending downwardly from said flotation means to a lower edge portion, a substantially V-shaped bottom connected to the lower edge portion of said plurality of walls, a plurality of longitudinally spaced panels extending vertically within said enclosure to define a plurality of process chambers communicated with each other alternately over the top and bottom edges of the panels, said plurality of walls and panels and said bottom being formed from flexible fiberglass reinforced plastic, an inlet opening in one of said plurality of walls beneath the level of the surrounding raw water for drawing raw water into said enclosure, outlet means remote from the inlet opening and adjacent the airtight pipe comprising a plurality of weirs for discharging purified water from said enclosure, a settled water chamber at the end of said enclosure remote from said inlet opening for receiving purified water from said outlet means and pumping means in fluid communication with said settled water chamber for pumping settled water from the plant.

* * * * *